July 7, 1953
C. E. HEMMINGER
2,644,745
PRODUCTION OF GASES FROM CARBONACEOUS SOLIDS
Filed April 1, 1947
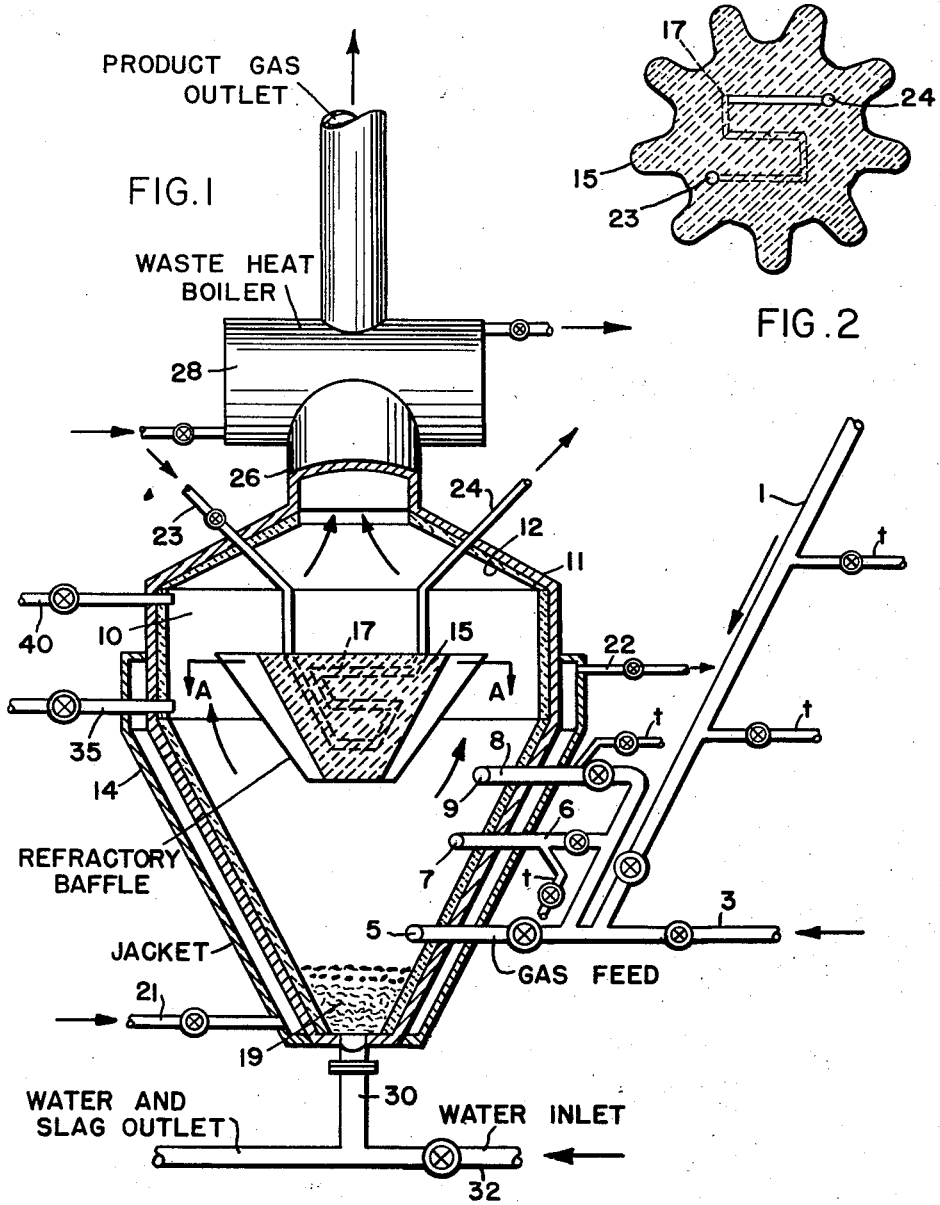
INVENTOR
CHARLES E. HEMMINGER
BY J. Cashman
ATTORNEY Patented July 7, 1953

2,644,745

UNITED STATES PATENT OFFICE 2,644,745

PRODUCTION OF GASES FROM CARBONACEOUS SOLIDS

Charles E. Hemminger, Westfield, N. J., assignor to Standard Oil Development Company, a corporation of Delaware Application April 1, 1947, Serial No. 738,700

7 Claims. (Cl. 48—203)

The present invention relates to the conversion of carbonaceous solids into combustible gases. More specifically, the invention is concerned with the gasification of all types of coal, lignite, peat, oil shale, tar sands, coke, oil coke, cellulosic materials, including lignin, etc. to produce gases containing carbon monoxide, such as producer gas, water gas, gas mixtures containing CO and $H_2$ suitable for the catalytic synthesis of hydrocarbons and oxygenated compounds, etc.

Heretofore, solid fuel materials such as coke, coal and the like, have been converted with steam, $CO_2$, and/or free oxygen-containing gases into more valuable gaseous fuels and gas mixtures suitable for chemical synthesis mainly by fixed bed processes. These processes involve discontinuous operation or inefficient conversion of the available carbon into heat and combustible gases.

The operation of these processes may be made fully continuous by employing powdered solids techniques, such as the so-called fluid solids technique, in which the reactions take place is fluidized beds of finely divided solids maintained in a turbulent ebullient state by means of fluidizing gases. This technique is superior to fixed bed operation also with respect to process control and gas yields per unit volume of reactor space. However, difficulties are encountered in the substantially complete conversion of the available carbon into product gas and heat required for the process at satisfactory conversion rates and economical reactor dimensions.

The most important single cause of these difficulties must be found in the fact that in conventional fluid operation the entire reacting mass of fluidized carbonaceous solids has a substantially uniform carbon concentration. As a result, the gasification residue withdrawn from the fluid gas generator has substantially the same carbon concentration as the solids undergoing gasification and must be reprocessed in order to avoid carbon losses. This difficulty may be alleviated by increasing reactor space and residence time. However, even in reactors of excessive dimensions carbon losses in the form of solid carbonaceous gasification residue cannot be completely avoided in continuous operation. Another reason for incomplete conversion is predicated on the relatively low conversion temperature dictated by the fusion point of the ash which must be kept solid to make the conventional powdered solids systems operative. Similar problems arise in other types of continuous powdered solids operation.

It has also been suggested to gasify carbonaceous solids in fixed bed operation at temperatures of about 1800°–3000° F. at which the ash of the solid charge is fused and removed in liquid form. While this operation affords more complete carbon utilization it is limited to large sized starting materials of more than 1" diameter and cannot be used to gasify the large quantities of coal which are mined in small sizes below about ½ in. diameter. In addition, channeling and local overheating lead to irregular product gas composition and to wall effects causing premature deterioration of the equipment.

The present invention overcomes the aforementioned difficulties and affords various additional advantages. These advantages, the nature of the invention and the manner in which it is carried out will be fully understood from the following description thereof read with reference to the accompanying drawing.

It is, therefore, the principal object of my invention to provide improved means for the continuous production of combustible gases from carbonaceous solids.

Another object of my invention is to provide an improved process for the continuous gasification of carbonaceous solids in a finely divided state at optimum rates of conversion and with full utilization of available carbon.

A more specific object of my invention is to provide an improved process for the continuous conversion of finely divided carbonaceous solids into gas mixtures containing $H_2$ and CO, suitable for the catalytic synthesis of hydrocarbons and oxygenated organic compounds, at optimum gasification rates, full utilization of available carbon in the gasification process and convenient disposal of non-carbonaceous solid gasification residue.

Other and more specific objects and advantages will appear hereinafter.

In accordance with the present invention, finely divided carbonaceous solids are gasified in continuous operation while suspended in the gaseous gasifying medium such as steam and/or $CO_2$ at temperatures above the fusion point of the ash, heat required to support the endothermic gasification reaction and to maintain the high reaction temperatures being generated by a partial combustion of the carbonaceous charge with free oxygen. Gasification temperatures of about 1800°–3000° F. and preferably 2100°–2500° F. and pressures ranging from atmospheric to about 400 lbs. per sq. in. are suitable for the gasification of most of the common carbonaceous solids such as coals, shales, coke, etc. However, higher temperatures may be used, if desired. This process permits continuous and complete conversion of available carbon into heat and product gas and the withdrawal of substantially carbon free ash in liquid form from the gas generator while avoiding the disadvantages of fixed bed operation.

The rate of conversion of steam and/or $CO_2$ at the high temperatures specified is so great that considerably smaller amounts of these gases need be contacted with the carbonaceous solids than in conventional operation to obtain a desired amount of product gas. Furthermore, this increase in the conversion rate with rising temperatures is so significant that economic product gas yields based on carbonaceous solids charged may be secured at such dilution ratios of the oxygen with steam and/or $CO_2$, as will still permit the high combustion rates required to maintain the desired high temperature levels.

The high gasification temperatures required for the purposes of my invention are produced by passing a suspension of finely divided carbonaceous solids in a gas mixture containing oxygen and steam and/or $CO_2$ in suitable proportions at a relatively high velocity tangentially along the axis of an extended gasification zone so as to impart a rotating swirling motion to the suspension.

The particle size of the carbonaceous solids should not exceed about $\frac{1}{8}$–$\frac{1}{4}$ in. diameter and preferably falls within the approximate range of 20 to 100 mesh in order to assure optimum contact between reactive carbon and gaseous reactants. Suitable gas feed rates may vary within fairly wide limits mainly depending on the character of the solids charge and the product gas desired. Quite generally it may be stated that the generation of a producer gas of about 290–300 B. t. u. requires about 0.2 to 0.33 normal cu. ft. of oxygen and about .1 to .2 normal cu. ft. of $CO_2$ per lb. of carbon charged. For the production of water gas having a $H_2$:CO ratio of approximately 0.3:1, an oxygen feed of about 5 to 9 normal cu. ft. and a steam feed of about .3 to .6 lb. per lb. of carbon charged are generally sufficient.

Where hydrocarbon synthesis gas of $H_2$:CO ratio of 1:1 or higher, say 1.5:1, is desired, it is advantageous to produce the 0.3:1 ratio gas mentioned from a solid fuel such as coke so as to limit the steam introduction to the reactor and to permit the maintenance of a reactor temperature above the fusion point of the ash. This gas may then be mixed with steam and passed through a water gas shift converter to convert CO to $H_2$ and $CO_2$, the latter being removed by scrubbing.

In order to permit the withdrawal of substantially carbon free liquid ash from the reactor, the suspension of carbonaceous solids in gases is preferably conducted in a generally upward direction through a substantially vertical gasification zone having walls sloping outwardly toward the top of the gasification zone. In this manner, the linear gas velocity may be reduced in the direction of the gas flow through the gasification zone in spite of the considerable increase in gas volume resulting from the gasification reaction. This reduction of the linear gas velocity permits the fused ash droplets to drop out of the product gas and to be collected in a bottom portion of the gasification zone.

In cases in which the fusion temperature of the ash of the carbonaceous charge is higher than the temperature desired for the gasification reaction, fusion agents such as iron, alkalis, limestone, low-fusing coal ash, etc. may be added to the solid charge. Recycling of slag previously formed to the amount of about 25% of the charge fuel is also beneficial in aiding the fusion of the ash.

Having set forth its objects and general nature, the invention will be best understood from the more detailed description hereinafter in which reference will be made to the accompanying drawing wherein Fig. 1 is a perspective view in partial vertical section of gasifying retort and certain accessory apparatus, and Fig. 2 is a cross-sectional view taken along A—A of Fig. 1.

Referring now in detail to Fig. 1, the apparatus illustrated therein essentially consists of a gas generator 10 provided with a refractory baffle 15 whose functions will be forthwith explained. Generator 10 has the form of a vertical pear-shaped vessel, the diameter of which increases from the bottom to the top. The vessel may be constructed of an outer steel shell 11 provided with an inner refractory lining 12, preferably of chrome ore having a fusion point not substantially below 2700° F. The slope of the generator walls is preferably so chosen that the linear velocity of the gases flowing upwardly through the generator at gas generation conditions drops by about $\frac{1}{4}$ between the narrowest and widest portions of the generator. Refractory baffle 15 which is arranged in the upper and wider portion of the generator space has the shape of an inverted cone and, preferably, a corrugated cross-section as shown in Fig. 2 to increase its effective surface area. Generator 10 may be provided with suitable wall-cooling means such as cooling coils arranged outside shell 11 or within lining 12 or with a cooling-jacket 14, for air or liquid cooling of the generator walls. Such cooling means cause the fused ash to form a solid glaze on the generator walls, which prevents liquid ash from reacting with, and ultimately destroying the wall refractory. Similar cooling means 17 may be arranged within baffle 15 for similar purposes as shown in Fig. 2.

In operation, finely divided carbonaceous solids such as coal, coke, shale or the like, are preferably dried and preheated, if desired, in heat exchange with product gases and/or fused slag to a temperature of about 200 to 600° F. in any conventional manner (not shown). A solids particle size of about minus $\frac{1}{8}$ in. diameter, i. e. a particle size at which coal is obtained from many mines is suitable for the process of the invention.

The preheated solids charge is fed by any suitable means such as a standpipe 1 aerated with oxygen, steam or $CO_2$ through taps $t$, to the gas feed line 3 to which flows an intimate mixture of oxygen (or air enriched with oxygen) with steam and/or $CO_2$, preheated to a temperature of about 500° to 1000° F., preferably in heat exchange with product gases and/or fused slag. The solids-in-gas suspension formed in pipe 3 is forced under the combined pressures of standpipe 1 and gas pressure on line 3 through a nozzle 5 directing the flow of the suspension in a tangential direction into generator 10. If desired, one or more streams of solids-in-gas suspension may be charged, through any desired number of lines 6, 8 provided with tangential feed nozzles 7, 9 at different levels of the generator height below baffle 15, using the pseudo-hydrostatic pressure of standpipe 1 or any other conventional feeding means to pass the solids into generator 10.

The absolute and relative amounts of oxygen, steam and/or $CO_2$ are so chosen that complete conversion of the carbon fed with the solid charge to gaseous products, that is chiefly CO takes place at a temperature above the fusion point of the ash of the solid charge. Preferred gas feed ratios fall within the approximate limits of 0.2 to 0.8 part of steam per part of $O_2$ or 0.1 to 0.5 part of $CO_2$ per part of $O_2$ by volume or corresponding ratios of mixtures of $H_2O$ with $CO_2$ to $O_2$. The linear velocity of the gas in the lower portion of generator 10 may be maintained within the approximate range of 0.5–5 ft. per second to impart in cooperation with the tangential direction of flow, a violently swirling motion to the solids-in-gas suspension whereby the gas-solids contact is greatly intensified and the conversion is appreciably increased. The slope of the generator walls is so chosen that the linear gas velocity in the upper wider generator portion drops to about one-fourth its original value, say to about 0.1–1.2 ft. per second.

While flowing upwardly through reactor 10 at temperatures of about 2100°–2500° F. the carbon of the solid particles is consumed and the ash is fused to form droplets which drop to the bottom of reactor 10 or impinge on the walls of baffle 15 to form a liquid coating thereon from which fused ash drops to the bottom portion of generator 10, which serves as a slag pot 19. Baffle 15 acts simultaneously as a heat accumulator and prevents heat losses by radiation from the generator. Liquid ash which, as a result of centrifugal forces, may be deposited on the refractory lining of generator 10 will flow down the sloping generator walls to reach, likewise, slag pot 19.

Any carbonaceous solids fines reaching the surface of baffle 15 or the generator walls will be suspended on the surface of the liquid ash and be intensively subjected to the gasifying action of the violently swirling gases so that practically no finely divided carbonaceous matter reaches slag pot 19. Carbonaceous particles too large to remain suspended in the gases entering generator 10 collect in the bottom zone of generator 10 on top of the liquid slag in slag pot 19 where they remain until they are completely gasified by the turbulent gases contacting them.

Cooling means 14 and 17 are supplied with cooling medium, preferably water, by circulating means 21, 22, 23 and 24 in such a manner as to cool only a thin surface layer of accumulated fused ash below its fusion point without withdrawing an appreciable amount of heat from generator 10.

The product gas passing baffle 15 is withdrawn from generator 10 through discharge pipe 26 and rapidly cooled to any desired temperature of say 600° to 1000° F. in a waste heat boiler 28 wherein steam required for the process may be produced. The cooled product gas is then passed to conventional purification equipment (not shown) for the removal of $CO_2$ and/or sulfur compounds, if desired after further heat exchange with process gases and/or solids.

Liquid ash is withdrawn downwardly from slag pot 19 through line 30 from which it may be fed to a water line 32 to be cooled in the form of small solid particles and carried away as a solids-in-water suspension.

The apparatus described above permits of various modifications. For example gas, particularly oxygen-containing gas, may be fed to generator 10 at several points distributed over the circumference and/or height of the generator as indicate at 35 and 40. Other solids supply means such as screw conveyors, lockhoppers, or the like may take the place of standpipe 1. Instead of passing the suspension of carbonaceous solids upwardly through a vertical generator, the latter may be designed for substantially horizontal or downward flow provided the finely divided solids charge is gasified in the form of a highly turbulent dilute suspension in the gasifying gases at temperatures above the fusion point of the ash and means are employed which permit a separate withdrawal of liquid ash and product gases. Other modifications of the apparatus described may appear to those skilled in the art without deviating from the spirit of the invention.

The invention will be further illustrated by the following specific example.

*Example*

For the production of water gas by the conversion of a bituminous coal with steam the process of the invention may be operated with good results at the conditions given below.

| | |
|---|---|
| Coal particle size, mesh | 50–200 |
| Ash fusion point, °F | 2000 |
| Reactor temperature, °F | 2300 |
| Coal preheating temperature, °F | 250 |
| Oxygen and steam preheating temperature, °F | 700 |
| Purity of oxygen fed, per cent | 95 |
| Oxygen feed rate, normal cu. ft./lb. of coal | 7 |
| Steam feed rate, lb./lb. of coal | 0.4 |
| Linear gas velocities, ft./sec.: | |
| At reactor bottom | 3 |
| At reactor top | 0.8 |
| Around baffle 15 | 5 |
| Product gas composition, per cent: | |
| $CO_2$ | 3 |
| CO | 70 |
| $H_2$ | 23 |
| $CH_4$ | 0.5 |
| $N_2$ | 3.5 |
| | 100.00 |

The conditions specified above may be maintained at a gasification rate of about 15,000 cu. ft. of product gas per sq. ft. of reactor area at the level of the lowest reactor feed point.

While the foregoing description and exemplary operations have served to illustrate specific applications and results of my invention, other modifications obvious to those skilled in the art are within the scope of my invention. Only such limitations should be imposed on the invention as are indicated in the appended claims.

I claim:

1. In the process of converting solid carbonaceous ash-containing materials into gases containing carbon monoxide, the improvement which comprises forming a suspension of finely divided carbonaceous ash-containing solids in a gaseous medium containing oxygen in admixture with a member selected from the group consisting of steam, carbon dioxide and mixtures thereof, forcing the resulting suspension at a high linear velocity tangentially into a lower part of an upright extended conversion zone having a circular horizontal cross-section and thereby causing violent agitation of said suspension in said conversion zone, maintaining in said conversion zone a pressure between atmospheric and about 400 lbs. per square inch and a conversion temperature above the fusion point of the ash constituents of the carbonaceous solids in the range from 2100 to 2500° F., passing the introduced suspension upwardly through the conversion zone, providing a gradually increasing conversion space for said upwardly passing suspension, thereby gradually reducing the linear velocity of the suspended gas during its upward path through said conversion zone and thus causing fused ash to be deposited on the circumference of the conversion zone and to collect in a slag collecting zone located at the bottom of the conversion zone, cooling the walls of said conversion zone by indirect heat exchange to a surface temperature just below the fusion point of said ash constituents to form a thin solidified layer of fused ash on the walls of the conversion zone, withdrawing a gas which contains carbon monoxide from an upper portion of said conversion zone and separately withdrawing fused ash constituents from said slag collecting zone.

2. The process of claim 1 wherein the said suspension of carbonaceous solids in gaseous medium is supplied tangentially into said conversion zone at a plurality of vertically spaced points.

3. The process of claim 1 wherein the carbonaceous solids feed is mixed with up to about 25% of recycled slag to aid fusion of the ash constituents of said carbonaceous solids in the conversion zone.

4. The process of claim 1 wherein the linear velocity of the gases is reduced by about one-quarter of its original value during the upward flow of the gases through the conversion zone.

5. The process of claim 1 wherein said gasifying medium comprises oxygen and steam and said temperature is maintained by a partial combustion of the carbonaceous constituents of said solids.

6. The process of claim 1 wherein said gasifying medium comprises oxygen and $CO_2$ and said temperature is maintained by a partial combustion of the carbonaceous constituents of said solids.

7. The process of claim 1 wherein the upward flow of non-gaseous constituents is arrested by a horizontal surface cooled just below the fusion point of said ash constituents.

CHARLES E. HEMMINGER.

References Cited in the file of this patent

UNITED STATES PATENTS

| Number | Name | Date |
|---|---|---|
| 778,894 | Trump | Jan. 5, 1904 |
| 906,441 | Marconnet | Dec. 8, 1908 |
| 1,027,290 | Smith | May 21, 1912 |
| 1,559,622 | Klotzer | Nov. 3, 1925 |
| 1,692,724 | Duffield | Nov. 20, 1928 |
| 1,713,830 | Nielson et al. | June 25, 1929 |
| 1,869,949 | Szikla et al. | Aug. 2, 1932 |
| 1,913,968 | Winkler | June 13, 1933 |
| 2,111,579 | Winkler et al. | Mar. 22, 1938 |
| 2,302,156 | Totzek | Nov. 17, 1942 |
| 2,357,301 | Bailey et al. | Sept. 5, 1944 |
| 2,388,348 | Stimson | Nov. 6, 1948 |

FOREIGN PATENTS

| Number | Country | Date |
|---|---|---|
| 413,130 | Great Britain | July 12, 1934 |